V. HAUSE.
SEAL FOR COCKS.
APPLICATION FILED MAR. 18, 1919.

1,333,309.

Patented Mar. 9, 1920.

INVENTOR.
Vollie Hause
By Louis C. Vanderlip
Atty.

UNITED STATES PATENT OFFICE.

VOLLIE HAUSE, OF ELKHART, INDIANA.

SEAL FOR COCKS.

1,333,309.  Specification of Letters Patent.  Patented Mar. 9, 1920.

Application filed March 18, 1919. Serial No. 283,331.

*To all whom it may concern:*

Be it known that I, VOLLIE HAUSE, a citizen of the United States, and a resident of the city of Elkhart, county of Elkhart, Indiana, have invented certain new and useful Improvements in Seals for Cocks, of which the following is a specification.

My invention relates to stop-cocks, or valves, for gas, water, oil and the like, and especially to improved means for sealing such cocks.

The principal object of my invention is to produce a stop-cock which cannot be operated by unauthorized persons without breaking a seal. I accomplish this by capping both the top and bottom ends of the valve itself and sealing the caps, whereby the valve top and bottom are not only effectually covered and concealed but also rendered inaccessible until the cap seal has been broken. Other objects of my invention are described herein.

Figure 1:
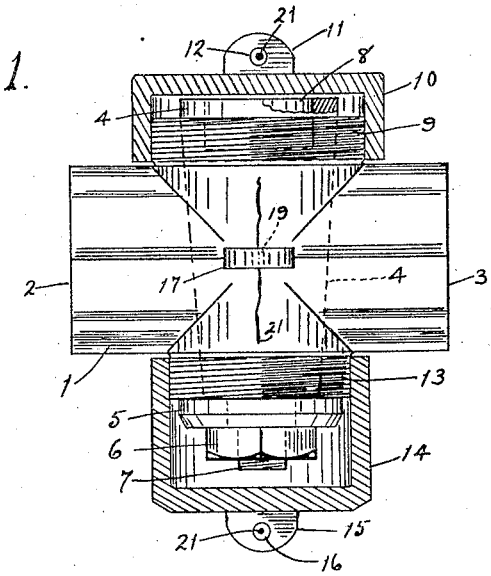
Figure 2:
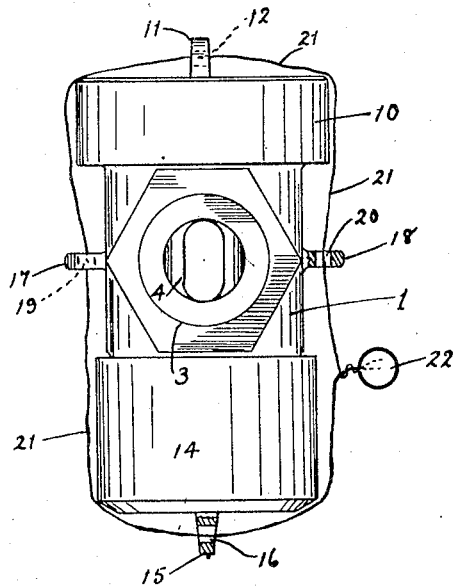

The preferred embodiment of my invention is illustrated in the accompanying drawing in which Figure 1 is a side elevation showing the valve caps or covers in section; and Fig. 2 is a view in end elevation.

Similar numerals of reference indicate like members and parts of members throughout the several views on the drawing.

Referring to the drawing in detail, the numeral 1 indicates the valve casing having the usual orifices 2 and 3 for pipe connections, and provided with the usual revoluble valve 4 of conical formation mounted therein. The valve 4 is usually provided at its bottom end with a washer 5 held in position by a nut 6 which is screw threaded upon the reduced valve stud end 7. Numeral 8 indicates a wrench socket which may be formed in the top end of the valve 4, whereby wrench application for valve operation may be effected.

Numeral 9 indicates an annular upwardly projecting cap bearing portion formed on the valve casing 1 upon which the cup-like cap or cover member 10 is screw threaded, whereby the upper end of the valve 4 is covered and concealed. Numeral 11 indicates a lug carried on the top of the cap 10 and apertured at 12. Numeral 13 indicates an annular downwardly projecting cap bearing portion formed on the valve casing 1 upon which the cap or cover 14 is screw threaded, whereby the lower end of the valve 4, the washer 5 and the nut 6 are covered when the cap is in position. The cap 14 is provided with a depending lug 15 which is apertured at 16.

The cock or valve casing 1 may be provided with a plurality of oppositely disposed lugs 17 and 18 which lugs are apertured at 19 and 20, respectively. Numeral 21 indicates a flexible sealing wire or member engaging and passing through the apertures 12, 19, 16 and 20 of the lugs 11, 17, 15 and 18, respectively, the wire ends being embedded and carried in the usual seal 22, or a seal of any type suitable for the purpose.

Obviously, the cap 10 must be unscrewed to gain access to the wrench socket 8 in the valve 4, and the cap 14 must likewise be unscrewed to gain access to the lower end of the valve, and to unscrew either of said caps would inevitably result in breaking the seal wire 21 or the tearing of it from the seal 22.

I claim:

1. The combination with a valve body having a conical bore and a revoluble cock or valve therefor, of a valve cap member screw threaded upon the valve body and over one end of the cock and adapted to cover and conceal the end of said cock; and a seal connecting said cap and valve body, whereby, when the cap is unscrewed the seal is broken.

2. The combination with a valve body having a passage therethrough and a conical bore arranged transversely of said passage and a revoluble valve or cock mounted in said conical bore, of a valve cap member screw threaded upon the valve body and over one end of said cock and adapted to cover and conceal the end of said cock; an apertured lug carried by the valve body; and a sealing member engaging through said lug aperture and connected with said cap member, whereby, when said cap is unscrewed, the sealing member is broken.

3. The combination with a valve body having a passage therethrough and a conical bore arranged transversely of said passage, and a revoluble valve or cock mounted in said conical bore, of a valve cap member screw threaded upon the valve body and over one end of said cock; and means connecting said cap member with said valve body, whereby, when said cap is unscrewed, said connecting means is broken.

4. The combination with a valve body having a passage therethrough and a conical bore formed transversely of said passage, said bore having a revoluble valve or cock mounted therein and having its opposite ends projecting to the exterior of said valve body, of a pair of valve cap members screw threaded upon the valve body on opposite sides thereof and at the opposite ends of said cock and adapted to render said cock ends inaccessible; and a sealing member connecting said cap members with said valve body, whereby, when either of said caps is unscrewed, said sealing member is broken.

In testimony whereof I have hereunto affixed my signature this 15th day of March, 1919.

VOLLIE HAUSE.